United States Patent
Zhuang et al.

(10) Patent No.: US 11,165,345 B2
(45) Date of Patent: Nov. 2, 2021

(54) MULTI-LEVEL BOOST APPARATUS

(71) Applicant: SUNGROW POWER SUPPLY CO., LTD., Anhui (CN)

(72) Inventors: Jiacai Zhuang, Anhui (CN); Jun Xu, Anhui (CN); Bing Zhang, Anhui (CN); Peng Wang, Anhui (CN); Peng Wen, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 304 days.

(21) Appl. No.: 16/537,056

(22) Filed: Aug. 9, 2019

(65) Prior Publication Data

US 2020/0076301 A1 Mar. 5, 2020

(30) Foreign Application Priority Data

Aug. 29, 2018 (CN) .......................... 201810993091.1

(51) Int. Cl.
*H02M 3/158* (2006.01)
*H02M 1/32* (2007.01)

(52) U.S. Cl.
CPC ............. *H02M 3/158* (2013.01); *H02M 1/32* (2013.01)

(58) Field of Classification Search
CPC ...... H02M 3/158; H02M 1/32; H02M 7/4837; H02M 1/0095; H02M 3/07; H02M 1/346; H02M 1/322; H02M 1/36; H02M 3/1584; Y02B 70/10

See application file for complete search history.

(56) References Cited

U.S. PATENT DOCUMENTS

| | | | |
|---|---|---|---|
| 7,548,435 B2 | 6/2009 | Mao | |
| 9,431,920 B2 | 8/2016 | Sasaki | |
| 9,981,562 B2 * | 5/2018 | Ide | ........................ B60L 15/007 |
| 2007/0230228 A1 | 10/2007 | Mao | |
| 2011/0019453 A1 * | 1/2011 | Gonzalez Senosiain | ..................... H02M 7/4837 363/131 |
| 2013/0002215 A1 * | 1/2013 | Ikeda | .................. H02M 7/4837 323/271 |
| 2013/0119961 A1 * | 5/2013 | Okuda | .................. H02M 3/158 323/299 |

(Continued)

FOREIGN PATENT DOCUMENTS

| | | |
|---|---|---|
| CN | 101047335 A | 10/2007 |
| CN | 104396129 A | 3/2015 |

OTHER PUBLICATIONS

See attached search history from EIC 2800 searcher Samir Patel for claim 1 on Jan. 16, 2020. (Year: 2020).*

(Continued)

*Primary Examiner* — Emily P Pham
*Assistant Examiner* — Htet Z Kyaw
(74) *Attorney, Agent, or Firm* — Harness, Dickey & Pierce, P.L.C.

(57) ABSTRACT

A multi-level boost apparatus. Voltage allocation among N first switches is achieved by connecting N voltage dividing modules, sequentially connected in series, in parallel with the N first voltage switches, respectively. Thereby, a voltage across each of the N first switches is within a safety range. Even if an input voltage is high and a voltage across a flying capacitor is zero at an instant of being powered, it is prevented that a second one to an N-th one of the N first switches break down due to overvoltage.

14 Claims, 18 Drawing Sheets

(56) References Cited

U.S. PATENT DOCUMENTS

2014/0266134 A1    9/2014  Zhak et al.
2015/0381072 A1   12/2015  Sasaki
2016/0285371 A1    9/2016  Fu
2017/0019027 A1*   1/2017  Knobloch ............. H02M 3/158
2019/0214904 A1*   7/2019  Yu ......................... H02M 3/158

OTHER PUBLICATIONS

Extended European Search Report regarding Application No. 19189498.9 dated Jan. 31, 2020.

Moon, Intae et al., "Design and Implementation of a 1.3 kW, 7-Level Flying Capacitor Multilevel AC-DC Converter with Power Factor Correction," IEEE Applied Power Electronics Conference and Exposition, 2017, pp. 67-73.

Chou, Derek et al., "A Lightweight, Multilevel GaN Maximum Power Point Tracker for Solar-Powered Race Vehicles," IEEE Power and Energy Conference, 2018, pp. 1-5.

Halamacek, Michael et al., "Capacitive Divider Based Passive Start-up Methods for Flying Capacitor Step-down DC-DC Converter Topologies," International Power Electronics Conference, 2018, pp. 831-837.

First Chinese Office Action regarding Application No. 201810993091.1 dated May 8, 2019. English translation provided by Unitalen Attorneys at Law.

* cited by examiner

MULTI-LEVEL BOOST APPARATUS

The present application claims priority to Chinese Patent Application No. 201810993091.1, titled "MULTI-LEVEL BOOST APPARATUS", filed on Aug. 29, 2018 with the China National Intellectual Property Administration, which is incorporated herein by reference in its entirety.

FIELD

The present disclosure relates to the field of power electronics technology, and particularly, to a multi-level boost apparatus.

BACKGROUND

With an increase in a voltage of a power electronic converter system, a requirement on a withstand voltage of a relevant switching device is gradually raised. Given an influence of a performance of semiconductor technology and the like, multi-level technology has become a hot topic of researches due to a capability to achieve a change in high-voltage power by using a low-voltage level device at a low cost.

Shown in FIG. 1 is a topology of a main circuit of a conventional three-level boost apparatus of a flying-capacitor type. Under a normal condition, voltage stresses of K1, K2, D1 and D2 are all half of an output voltage Vout. When the circuit is started, a voltage Vc across a flying capacitor C1 is 0V. In a case that an input voltage Vin is higher than a withstand voltage of K2, K2 breaks down at an instant of being powered due to overvoltage.

SUMMARY

A multi-level boost apparatus is provided according to the present disclosure, so as to address an issue that a switching transistor breaks down at an instant of being powered due to overvoltage in case of a high input voltage in conventional technology.

To achieve the above objective, following technical solutions are provided according to the present disclosure.

A multi-level boost apparatus is provided, where a main circuit of the multi-level boost apparatus includes an input capacitor, an input inductor, a first branch, a second branch, a third branch, and a fourth branch, and where:

a terminal of the input inductor is connected to a terminal of the input capacitor;

another terminal of the input inductor is connected to a terminal of the first branch and a terminal of the second branch, the first branch includes N first switches sequentially connected in series, a first one of the N first switches is connected to the input inductor, N is a positive integer greater than 1, the second branch includes N second switches sequentially connected in series, and a first one of the N second switches is connected to the input inductor;

a common node between the first one of the N second switches and a second one of the N second switches is connected to a terminal of the third branch, and the third branch includes N voltage dividing modules sequentially connected in series;

a first one of the N voltage dividing modules includes a first capacitor;

for each positive integer i that is greater than 1 and smaller than or equal to N:

a common node between an (i−1)-th one of the N voltage dividing modules and an i-th one of the N voltage dividing modules is connected to a common node between an (i−1)-th one of the N first switches and an i-th one of the N first switches;

the i-th one of the N voltage dividing modules includes: a controllable switch, a second inductor, and a second capacitor that are connected in series; and a discharge branch, configured to provide an electrical discharging loop for the second inductor, where the discharge branch includes a second power source, the second power source is configured to receive power from the second inductor, and the second capacitor is charged in a default state of the controllable switch;

another terminal of the second branch is connected to a terminal of the fourth branch, the terminal of the fourth branch and another terminal of the fourth branch are output terminals of the main circuit, and the fourth branch includes at least one output capacitor; and another terminal of the first branch, another terminal of the third branch, and the another terminal of the fourth branch are connected to another terminal of the input capacitor.

Preferably, the discharge branch further includes a directional device connected in series with the second power source, where:

the directional device is configured to prevent power from flowing from the second power source to the second inductor.

Preferably, the directional device is a second diode.

Preferably, N is greater than 2, and the multi-level boost apparatus further includes N−1 connection capacitors, where for each positive integer j that is smaller than N−1, a terminal of a j-th one of the N−1 connection capacitors is connected to a common node between a (j+1)-th one of the N second switches and a (j+2)-th one of the N second switches, and another terminal of the j-th one of the N−1 connection capacitors is connected to a common node between a (j+1)-th one of the N voltage dividing modules and a (j+2)-th one of the N voltage dividing modules.

Preferably, the N first switches are reverse-conducting transistors, the N second switches are diodes, and the controllable switch is a mechanical switch or a reverse-conducting transistor, where:

the input inductor and the second branch are arranged on a positive cable of the multi-level boost apparatus, and the common node between an (i−1)-th one of the N second switches and an i-th one of the N second switches is a node connecting a cathode of an (i−1)-th one of the diodes and an anode of an i-th one of the diodes, for each positive integer i that is greater than 1 and smaller than or equal to N; or the input inductor and the second branch are arranged on a negative cable of the multi-level boost apparatus, and the common node between an (i-1)-th one of the N second switches and an i-th one of the N second switches is a node connecting an anode of an (i-1)-th one of the diodes and a cathode of an i-th one of the diodes, for each positive integer i that is greater than 1 and smaller than or equal to N.

Preferably, the fourth branch includes multiple output capacitors sequentially connected in series, and the second power source includes all or a part of the multiple output capacitors in the fourth branch.

Preferably, the main circuit further includes N−1 clamp branches, where:

for each positive integer i that is greater than 1 and smaller than or equal to N, a common node between the (i−1)-th one of the N second switches and the i-th one of the N second switches is connected to a terminal of an (i−1)-th one of the N−1 clamp branches, and the (i−1)-th one of the N−1 clamp branches is configured to reduce a voltage across the i-th one of the N second switches; and another terminal of each of the N−1 clamp branches is connected to a node that is connected to the input capacitor, the first branch, the third branch and the fourth branch.

Preferably, each of the N−1 the clamp branches includes: a first diode and a first power source, and the first power source is configured to reduce a voltage across the i-th one of the second switches.

Preferably, the fourth branch includes N output capacitors sequentially connected in series, a first one of the N output capacitors is connected to the input capacitor, and an N-th one of the output capacitors is connected to the second branch, and each of the N−1 clamp branches includes a first diode, where:

the input inductor and the second branch are arranged on a positive cable of the multi-level boost apparatus, and a cathode of the first diode in the (i−1)-th one of the N−1 clamp branches is connected to a common node between the (i−1)-th one of the N second switches and the i-th one of the N second switches, and an anode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N; or the input inductor and the second branch are arranged on a negative cable of the multi-level boost apparatus, and an anode of the first diode in the (i−1)-th one of the N−1 clamp branches is connected to a common node between the (i−1)-th one of the N second switches and the i-th one of the N second switches, and a cathode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N.

Preferably, N is equal to 2, the fourth branch includes two output capacitors connected in series, and a controller of the multi-level boost apparatus is configured to: control the two first switches in the first branch to be turned off in response to Vin being switched in and Vout=Vc1=Vc2=0, and then control the main circuit to enter a normal operating mode in response to Vout=Vin;

control the two first switches in the first branch to be turned off in response to Vin being switched in, Vout/2<Vin<Vout and Vc1=Vc2=0; then control the two first switches in the first branch to be pulsingly turned on in an interleaved manner in response to Vc1=Vc2=Vin/2, until Vc1+Vc2=Vout; and then control the main circuit to enter the normal operation mode in response to Vc1+Vc2=Vout;

control the two first switches in the first branch to be turned off in response to Vin being switched in, Vout/4≤Vin≤Vout/2 and Vc1=Vc2=0; then control a second one of the two first switches in the first branch to be turned off, and the first one of the two first switches be turned on pulsingly, in response to Vc1=Vc2=Vin/2; then control the two first switches in the first branch to be pulsingly turned on in an interleaved manner in response to Vc1>Vco1, until Vc1+Vc2=Vout; and then control the main circuit to enter the normal operation mode in response to Vc1+Vc2=Vout; and control the second one of the two first switches in the first branch to be turned off, control the first one of the two first switches to be turned on pulsingly with a period of T1; and control the controllable switch to be turned on pulsingly with a period of T2, to discharge the second capacitor, in response to Vc1=Vout/2<Vc2 and the main circuit being in the normal operation mode, where T2 is smaller than T1; and where Vout is a voltage across the fourth branch, Vc1 is a voltage across the first capacitor, Vc2 is a voltage across the second capacitor, Vin is an input voltage of the multi-level boost apparatus, Vco1 is a voltage across one of the two output capacitors that is connected to the input capacitor, the first capacitor and the second capacitor are equal in capacitance, and capacitance of the one of the two output capacitors is three times the capacitance of another of the two output capacitors.

With the multi-level boost apparatus according to the present disclosure, voltage allocation among the N first switches is achieved by connecting the N voltage dividing modules, sequentially connected in series, in parallel with the N first voltage switches, respectively. Thereby, a voltage across each of the N first switches is within a safety range. Even if an input voltage is high and a voltage across a flying capacitor is zero at the instant of being powered, it is prevented that the second one to the N-th one of the first switches break down due to overvoltage.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

A multi-level boost apparatus is provided according to the present disclosure, so as to address an issue in conventional technology that a device has a risk of breakdown due to overvoltage at an instant of being powered under a high input voltage.

Figure 2A:
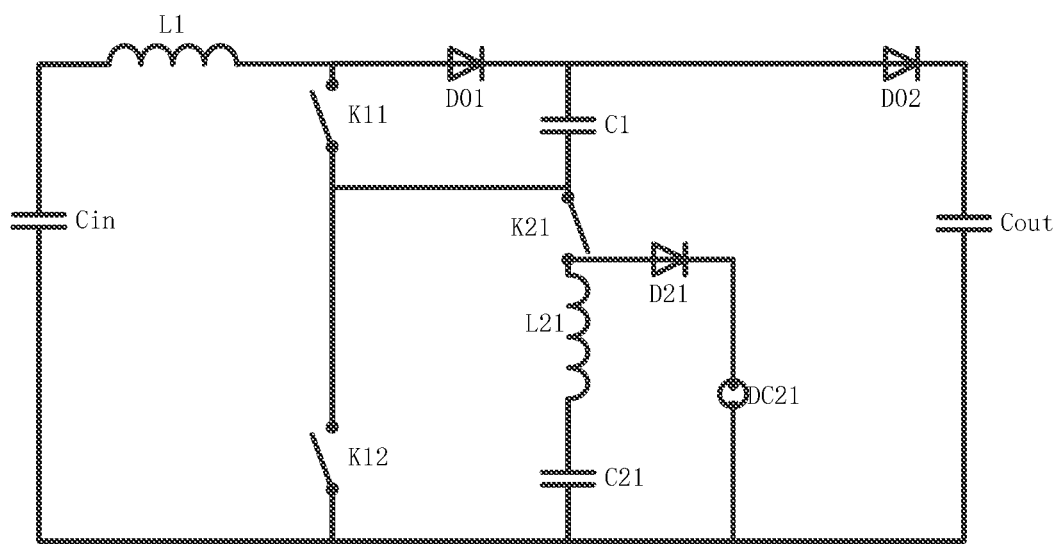
FIGS. 2a and 2b are two schematic structural diagrams of main circuits of three-level boost apparatuses according to an embodiment of the present disclosure.
Figure 2B:
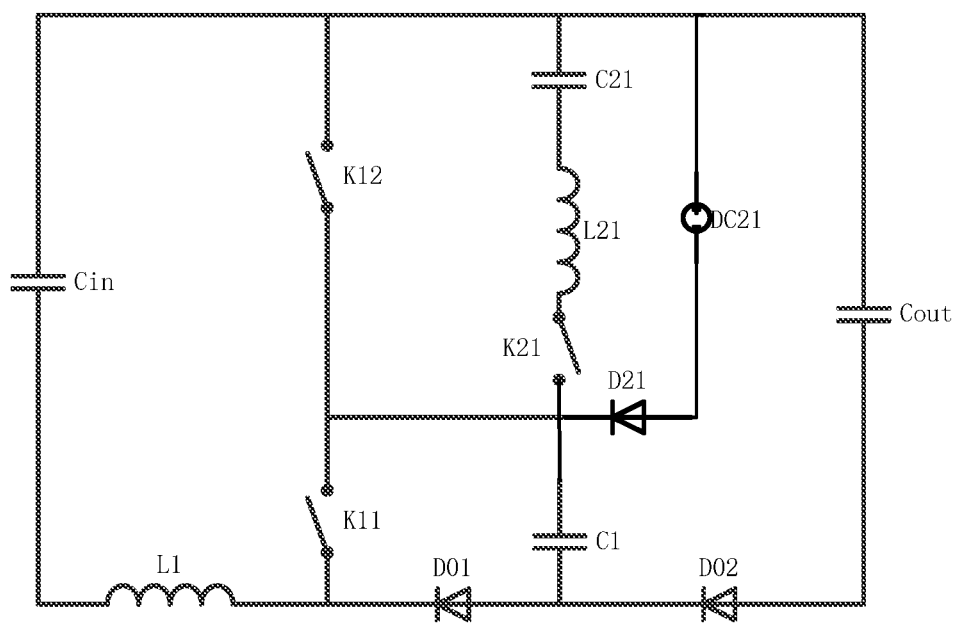
Figure 2C:
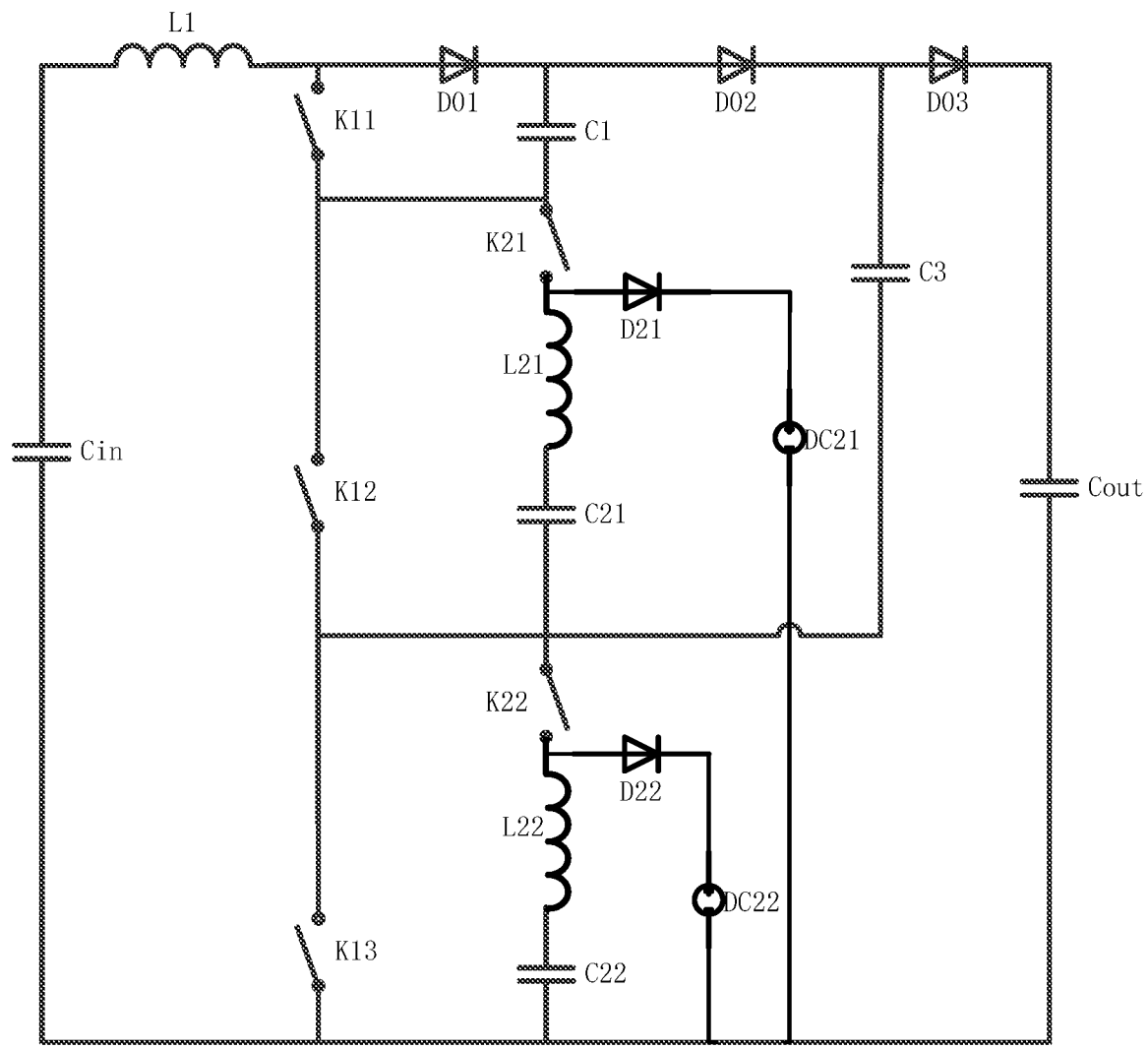
FIG. 2c is a schematic structural diagram of a main circuit of a five-level boost apparatus according to an embodiment of the present disclosure.

In practice, a multi-level boost apparatus generally includes a main circuit, a voltage-and-current detection device, a controller, and the like. Specifically, the main circuit of the multi-level boost apparatus may be as shown in FIG. 2a, FIG. 2b or FIG. 2c, including: an input capacitor Cin, an input inductor L1, a first branch, a second branch, a third branch and a fourth branch.

A terminal of the input inductor L1 is connected to a terminal of the input capacitor Cin.

Another terminal of the input inductor L1 is connected to a terminal of the first branch and a terminal of the second branch. The first branch includes N first switches (such as K11 and K12 in FIG. 2a and FIG. 2b, or K11, K12 and K13 in FIG. 2c) sequentially connected in series. The first switch K11 connected to the input inductor L1 is the 1st first switch. N is a positive integer greater than 1. The second branch includes N second switches (such as D01 and D02 in FIG. 2a and FIG. 2b, or D01, D02 and D03 in FIG. 2c) sequentially connected in series. The second switch D01 connected to the input inductor L1 is the 1st second switch.

A common node between the 1st second switch D01 and the 2nd second switch D02 is connected to a terminal of the third branch. The third branch includes N voltage dividing modules sequentially connected in series.

A common node between an (i−1)-th voltage dividing module and an i-th voltage dividing module is connected to a common node between an (i−1)-th first switch and an i-th first switch, for each positive integer i that is greater than 1 and smaller than or equal to N.

The 1st voltage dividing module includes a first capacitor C1.

The i-th voltage dividing module includes: a controllable switch (such as K21 in FIG. 2a and FIG. 2b, or K21 and K22 in FIG. 2c), a second inductor (such as L21 in FIG. 2a and FIG. 2b, or L21 and L22 in FIG. 2c), a second capacitor (such as C21 in FIG. 2a and FIG. 2b, or C21 and C22 in FIG. 2c) that are connected in series; and a discharge branch configured to an electrical discharging loop for the second inductor. The discharge branch includes a second diode (such as D21 in FIG. 2a and FIG. 2b, or D21 and D22 in FIG. 2c) and a second power source (such as DC21 in FIG. 2a and FIG. 2b, or DC21 and DC22 in FIG. 2c) that are connected in series. The second power source is configured to receive power from the second inductor. The second capacitor is charged in a default state of the controllable switch. In practice, another directional device other than the second diode may be used to prevent power from flowing from the second power source to the second inductor. Moreover, positions of the controllable switch, the second inductor, and the second capacitor are interchangeable, which are not limited to cases shown in FIG. 2a to FIG. 2c, and fall within the protection scope of the present disclosure.

Another terminal of the second branch is connected to a terminal of the fourth branch. Two terminals of the fourth branch are output terminals of the main circuit. A voltage across the two terminals of the fourth branch is an output voltage of the main circuit. The fourth branch includes at least one output capacitor (such as Cout in FIGS. 2a, 2b and 2c).

Another terminal of the first branch, another terminal of the third branch, and the another terminal of the fourth branch are all connected to another terminal of the input capacitor Cin.

In a case that N is greater than 2, the multi-level boost apparatus further includes N−1 connection capacitors (such as C3 in FIG. 2c). A terminal of the j-th connection capacitor is connected to a common node between the (j+1)-th second switch and the (j+2)-th second switch, and another terminal of the j-th connection capacitor is connected to a common node between the (j+1)-th voltage dividing module and the (j+2)-th voltage dividing module, for each positive integer j that is smaller than N−1.

In practice, the first switch may be a reverse-conducting transistor, and the second switch may be a diode. The controllable switch may be a normally-on mechanical switch, or a reverse-conducting transistor for charging, in a default state, the second capacitor in a same voltage dividing module. The reverse-conducting transistor may be a MOSFET, a JFET, an IGBT integrated with an antiparallel diode, or the like, which is not specifically limited herein and fall within the protection scope of the present disclosure based on an application environment.

In a case that the input inductor L1 and the second branch are arranged on a positive cable of the multi-level boost apparatus, as shown in FIG. 2a, the common node between the (i−1)-th second switch and the i-th second switch is a node connecting a cathode of the (i−1)-th diode and an anode of the i-th diode.

In a case that the input inductor L1 and the second branch are arranged on a negative cable of the multi-level boost apparatus, as shown in FIG. 2b, the common node between the (i−1)-th second switch and the i-th second switch is a node connecting an anode of the (i−1)-th diode and a cathode of the i-th diode.

FIGS. 2a and 2b are topologies in duality, and both are topologies of main circuits in case of N=2. The main circuits can achieve a three-level output. FIG. 2c is a topology of a main circuit in case of N=3, and the main circuit can achieve a five-level output. The dual topology for FIG. 2c and the topology of a main circuit in case of N>3 can be analogized according to the above cases, which are not shown herein and fall within the protection scope of the present disclosure.

The topology shown in FIG. 2a is taken as an example for illustration.

Figure 1:
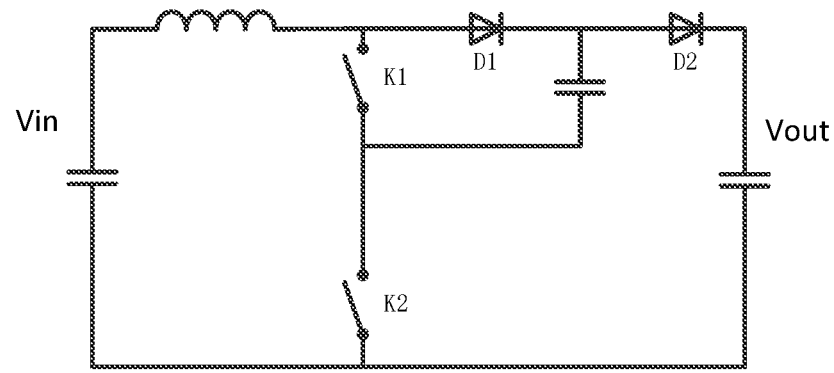
FIG. 1 is a schematic structural diagram of a main circuit of a multi-level boost apparatus in conventional technology.

Since parasitic capacitance of the two first switches K11 and K12 are much smaller than the first capacitor C1 and the second capacitor C21, voltage division of K11 and K12 on the input voltage at start-up can be ignored with respect to the first capacitor C1 and the second capacitor C21. Therefore, voltages bore by the two first switches K11 and K12 are determined by voltages across the first capacitor C1 and the second capacitor C21, respectively. The problem that the input voltage is completely bore by K2 in conventional technology, as shown in FIG. 1, is solved.

It should be noted that a resistor, a capacitor, or a combination of the two may replace the second power source in practice, to release power in the second inductor L21. In such case, there is an additional loss. With the multi-level boost apparatus according to the embodiment, the discharge branch arranged for each voltage dividing module of the main circuit includes a second power source configured to receiving power from the inductor.

Referring to FIG. 2a, the discharge branch for the second inductor L21 includes a second diode D21 and a second power source DC21. The second power source DC21 can receive power from the second inductor L21 via the second diode D21, and reuse the power to achieve energy optimization.

More preferably, in a case that the fourth branch includes multiple output capacitors sequentially connected in series, the second power source may include all or part of the output capacitors of the fourth branch. Thereby, a discharge channel can be provided for the second capacitors at shutdown, improving system safety.

Figure 3A:
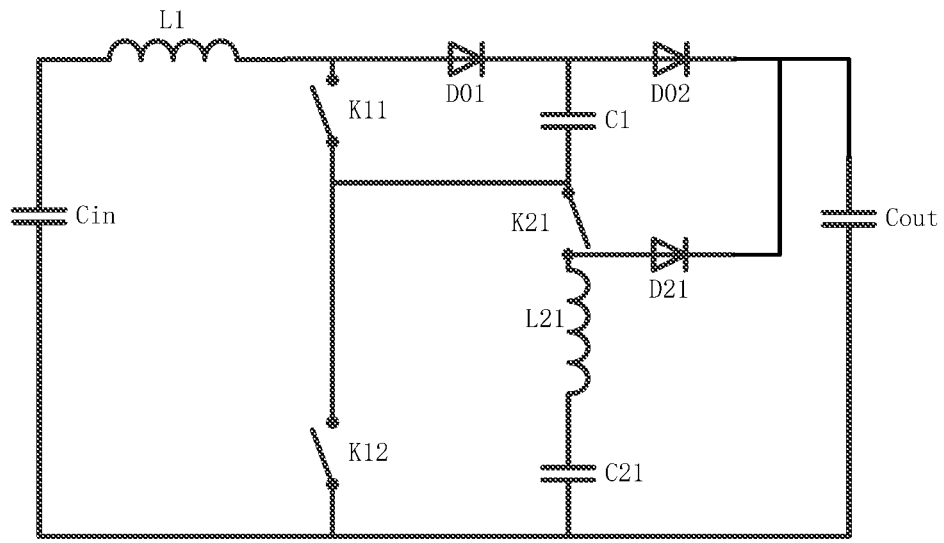
FIGS. 3a and 3b are two specific schematic structural diagrams of main circuits of three-level boost apparatuses according to an embodiment of the present disclosure.
Figure 3B:
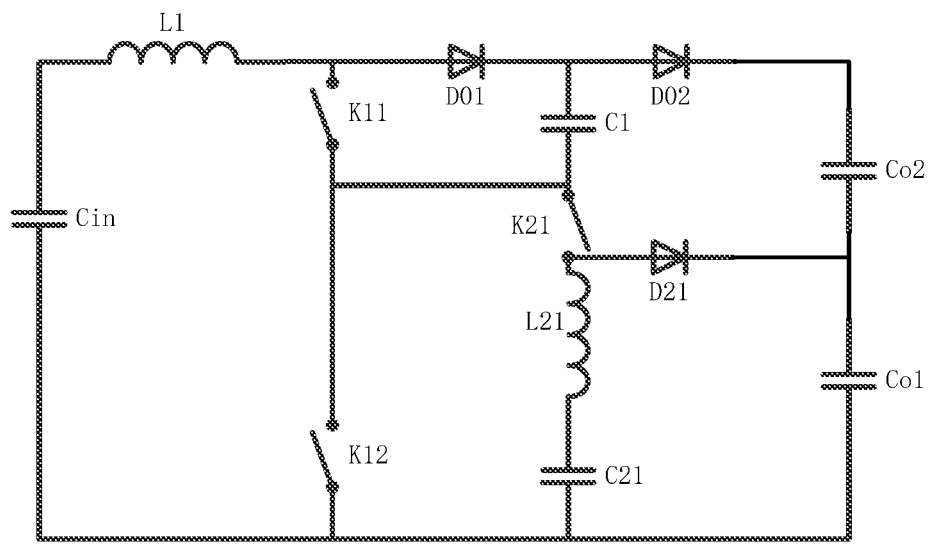

On the basis of FIG. 2a, the second diode D21 can feed the power in the second inductor L21 back to a main bus (Cout may be an equivalent from of one or more capacitors), as shown in FIG. 3a. Or, the second diode D21 can feed the power in the second inductor back L21 to a portion (Co1) of the bus, as shown in FIG. 3b. Moreover, in a case that the system is powered off, the second diode D21 can also provide a discharge loop for the second capacitor C21.

The clamp branch arranged in other topologies can be obtained by analogy, and is not described again herein.

In view of the above, with the multi-level boost apparatus according to the embodiment, voltage allocation among the N first switches is achieved by connecting the N voltage dividing modules, sequentially connected in series, in parallel with the N first voltage switches, respectively. Thereby, a voltage across each of the N first switches is within a safety range. Even if an input voltage is high and a voltage across a flying capacitor is zero at the instant of being powered, it is prevented that the second one to the N-th one of the first switches break down due to overvoltage.

Another multi-level boost apparatus is further provided in another embodiment of the present disclosure. Preferably, the main circuit further includes N−1 clamp branches, on the basis of the above embodiments.

Figure 4A:
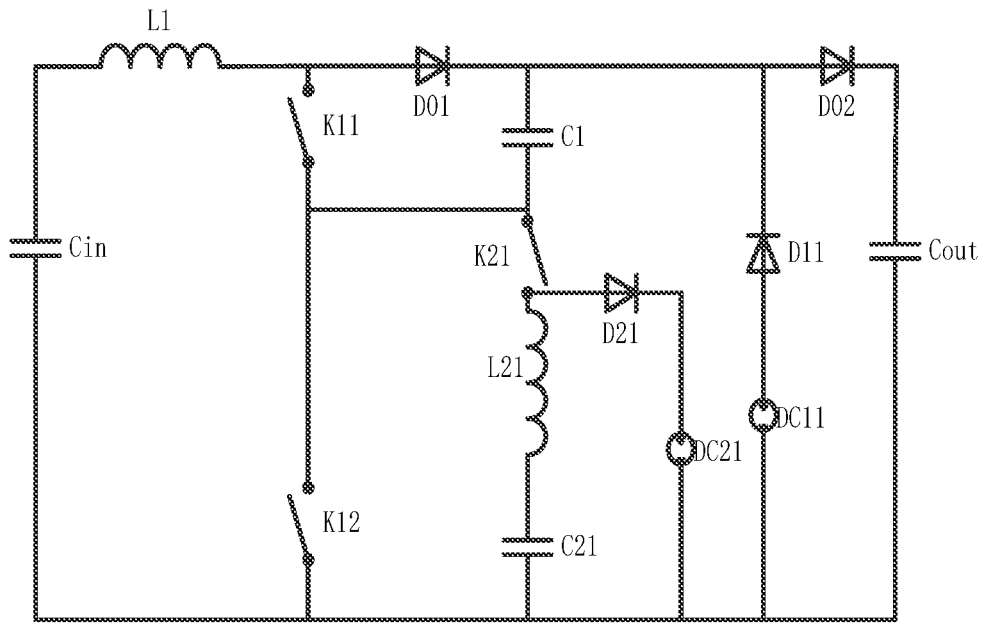
FIGS. 4a and 4b are two specific schematic structural diagrams of main circuits of three-level boost apparatuses according to an embodiment of the present disclosure.
Figure 4B:
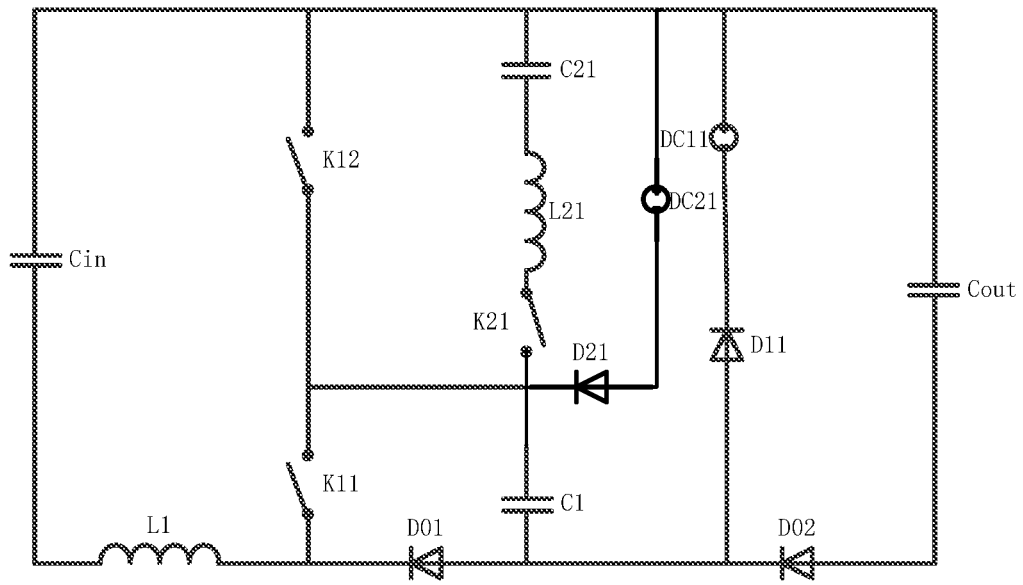
Figure 4C:
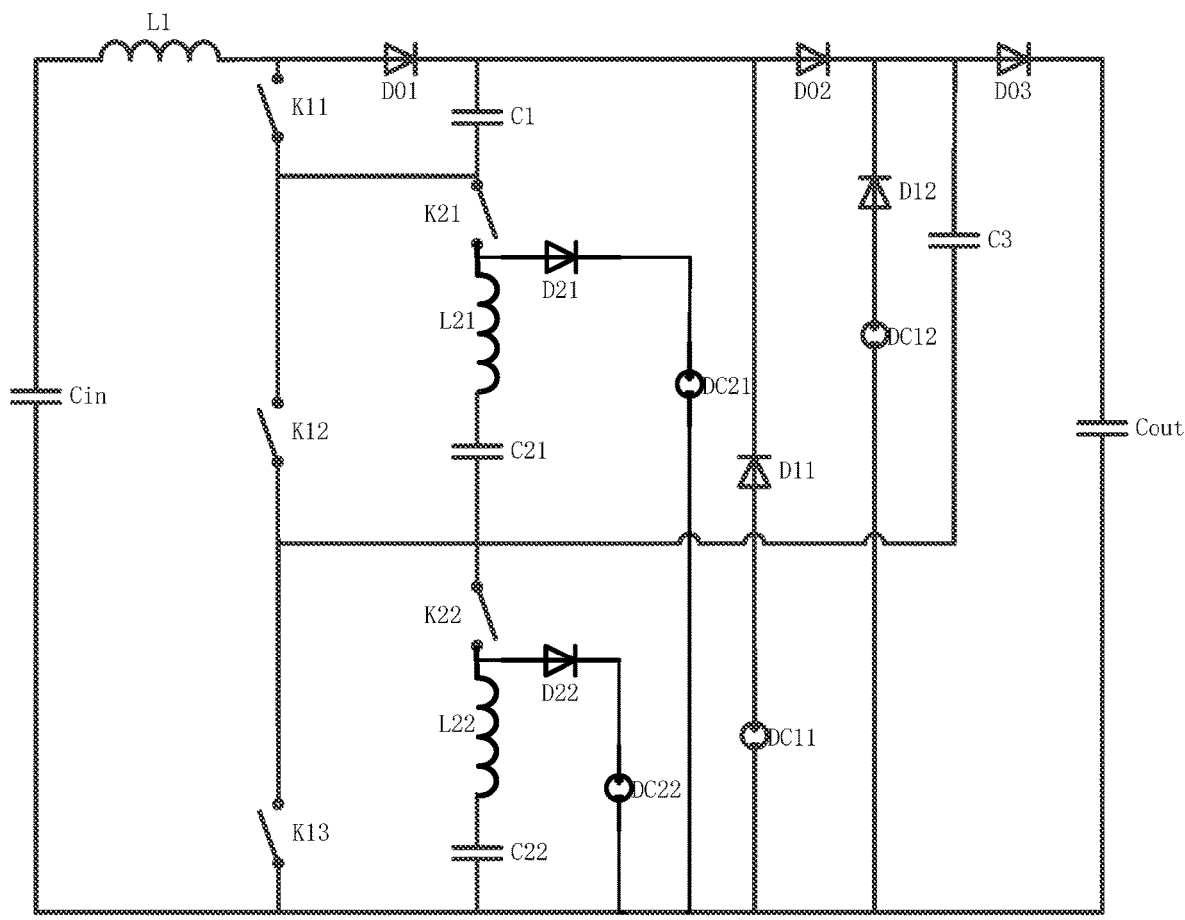
FIG. 4c is a schematic structural diagram of a main circuit of a five-level boost apparatus according to an embodiment of the present disclosure.

A common node between the (i−1)-th second switch and the i-th second switch is connected to a terminal of the (i−1)-th clamp branch. The (i−1)-th clamp branch is configured to reduce a voltage across the i-th second switch. As shown in FIG. 4a and FIG. 4b, a common node between D01 and D02 is connected to the first clamp branch (including D11 and DC11), and the 1st clamp branch is configured to reduce a voltage across the 2nd second switch D02. As shown in FIG. 4c, a common node between D01 and D02 is connected to the 1st clamp branch (including D11 and DC11), the 1st clamp branch is configured to reduce a voltage across the 2nd second switch D02, a common node between D02 and D03 is connected to the 2nd clamp branch (including D12 and DC12), and the 2nd clamp branch is configured to reduce a voltage across the 3rd second switch D03.

Specifically, as an example for topologies in duality, the input inductor L1 and the second branch are both arranged on a positive cable of the multi-level boost apparatus in FIG. 4a. A cathode of the first diode D11 is connected to a common node between corresponding two second switches (D01 and D02), an anode of the first diode D11 is connected to a positive terminal of the first power source DC11, and a negative terminal of the first power source DC11 is connected to the input capacitor Cin. The input inductor L1 and the second branch are both arranged on a negative cable of the multi-level boost apparatus in FIG. 4b. The anode of the first diode D11 is connected to the common node between the corresponding two second switches (D01 and D02), the cathode of the first diode D11 is connected to the negative terminal of the first power source DC11, and the positive terminal of the first power source DC11 is connected to the input capacitor Cin. For the five-level topology as shown in FIG. 4c, K22, L22, C22, D22, DC22, D03, D12, DC12, and C3 are added on the basis of FIG. 4a. Connections among all devices refer to FIG. 4c, and are not further described herein. In addition, principles in the topologies shown in FIG. 4b and FIG. 4c and other topologies are similar to the aforementioned content, which can be analogized and are not further described herein.

FIG. 4a is taken as an example for illustration. The clamp branch includes a first diode D11 and a first power source DC11. The clamp branch reduces the voltage across the second switch D02, to adjust a highest voltage across the 2nd second switch D02 to be a difference between a voltage across two terminals of the fourth branch (including Cout), namely, an output voltage of the multi-level boost apparatus, and a voltage across the clamp branch. Thereby, a voltage stress on the 2nd second switch D02 is reduced.

It can be obtained from the above that in the embodiment, the (i−1)-th clamp branch is arranged at the common node between the (i−1)-th second switch and the i-th second switch, so as to clamp the voltage on the i-th second switch at a difference between the voltage across the fourth branch (i.e., the output voltage of the multi-level boost apparatus) and the voltage across the corresponding clamp branch. Even in case of a low input voltage and a high output voltage, the risk can be prevented that the 2nd switch to the N-th second switch break down due to overvoltage at the instant of being powered.

Other structures and principles are same as the above embodiments, and are not further described herein.

In the embodiment, the problem of an excessive voltage stress on the switching transistor of conventional multi-level boost circuits of a flying-transistor type can be solved by using few devices. Devices with low withstand voltage can be selected for all the switching transistors. Reliable operation of the system is guaranteed within a wide input range of the circuit. Since the circuit operates at multiple levels, a volume and a cost of relevant filter components can be well controlled, rendering the system a great advantage in cost performance.

In practice, selection of the first power source is not specifically limited. The first power source may be an additional power source. Or, a part of the output voltage of the main circuit of the multi-level boost apparatus may serve as the first power source, to reduce the voltage on the corresponding second switch. Namely, in a case that the fourth branch includes N output capacitors (such as Co1 and Co2 in FIG. 5a and FIG. 5b, or Co1, Co2 and Co3 in FIG.

5c) connected in series. The output capacitor connected to the input capacitor Cin is the 1st output capacitor (such as Co1 in FIG. 5a to FIG. 5c), and the output capacitor connected to the second branch is the N-th output capacitor (such as Co2 in FIG. 5a and FIG. 5b, and Co3 in FIG. 5c). The clamp branch includes a first diode.

Figure 5A:
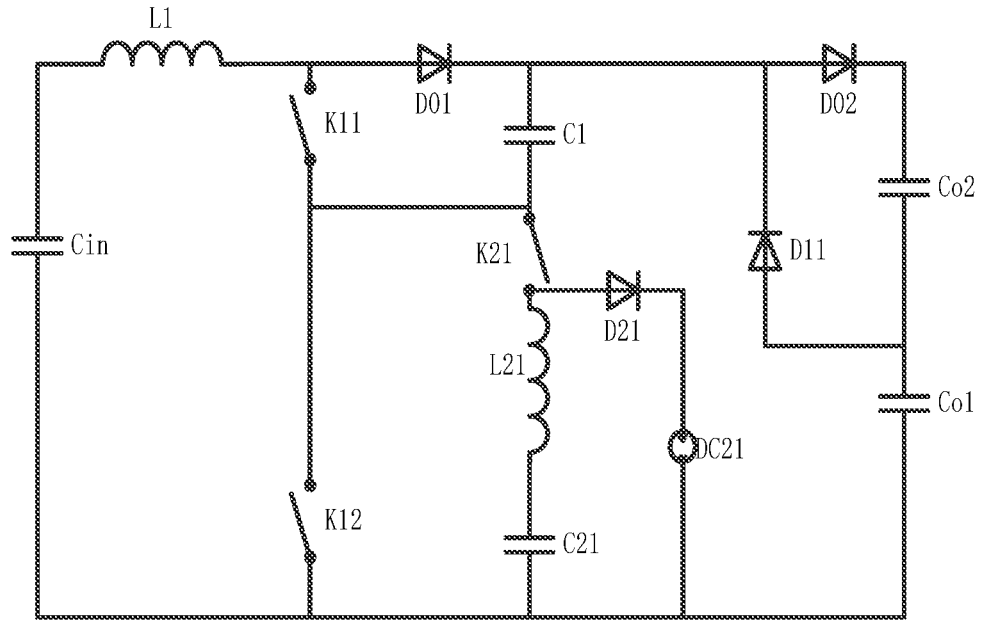
FIGS. 5a and 5b are two specific schematic structural diagrams of main circuits of three-level boost apparatuses according to an embodiment of the present disclosure.
Figure 5B:
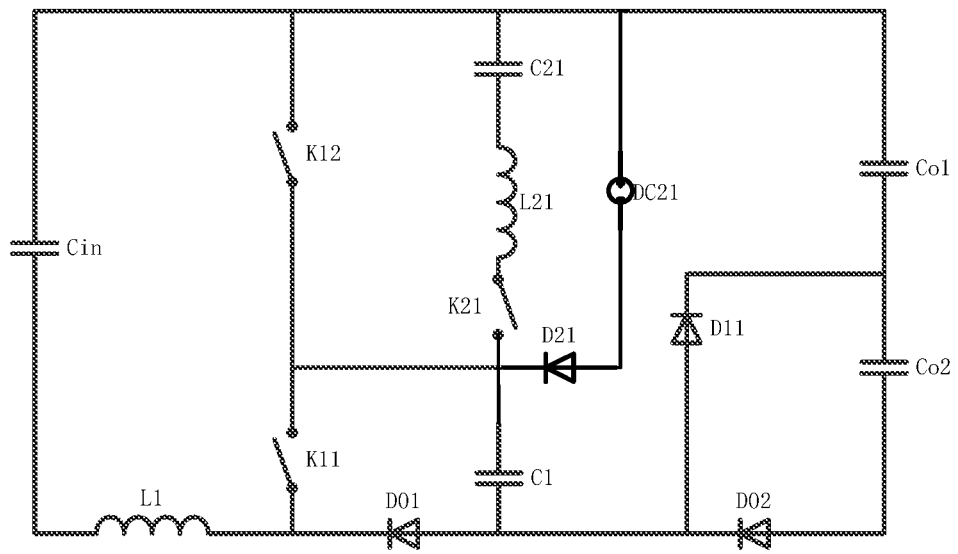
Figure 5C:
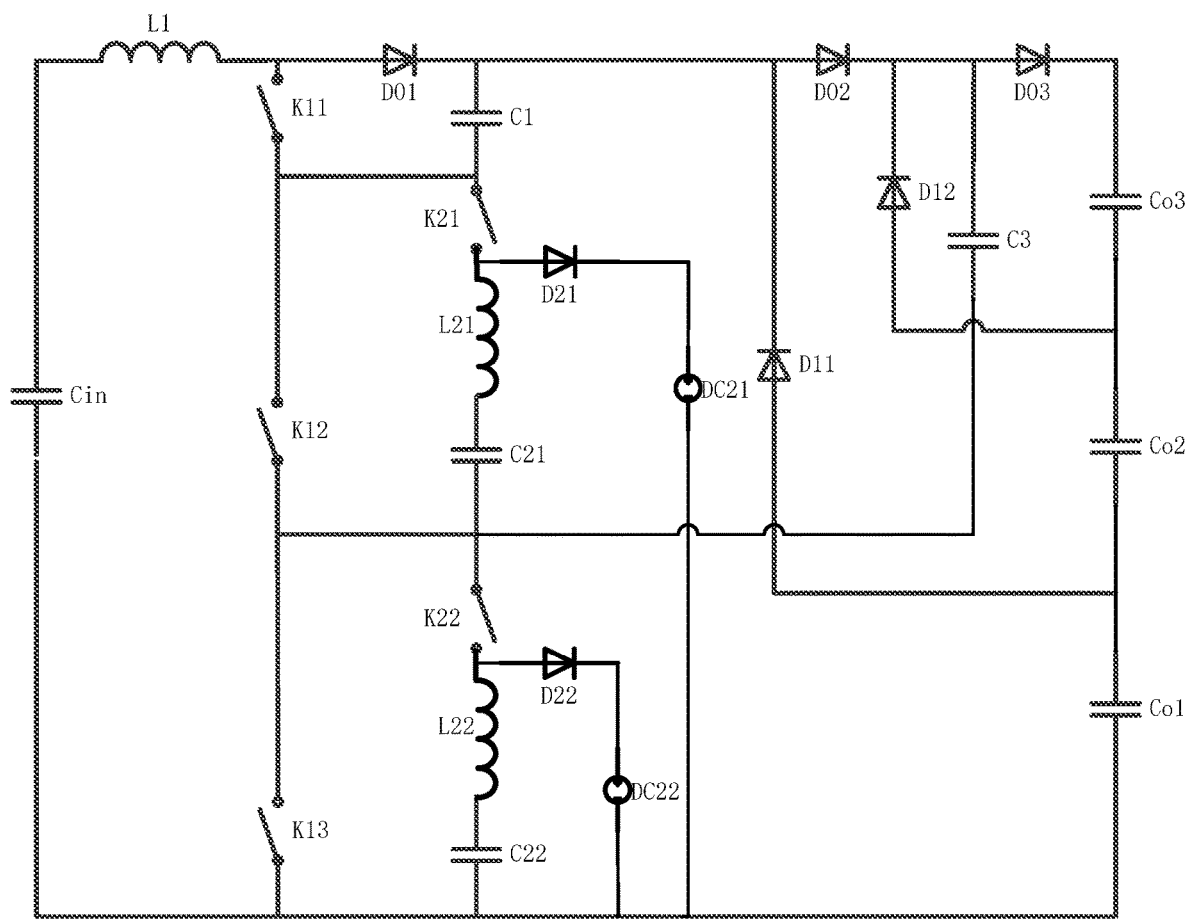
FIG. 5c is a schematic structural diagram of a main circuit of a five-level boost apparatus according to an embodiment of the present disclosure.

In a case that the input inductor L1 and the second branch are arranged on the positive cable of the multi-level boost apparatus, a cathode of the first diode in the (i−1)-th clamp branch is connected to the common node between the (i−1)-th second switch and the i-th second switch, and an anode of the first diode in the (i−1)-th clamp branch is connected to the common node between the (i−1)-th output capacitor and the i-th output capacitor. As shown in FIG. 5a and FIG. 5c, a cathode of D11 is connected to the common node between D01 and D02, and an anode of D11 is connected to the common node between Co1 and Co2. As shown in FIG. 5c, a cathode of D12 is connected to the common node between D02 and D03, and an anode of D12 is connected to the common node between Co2 and Co3.

In a case that the input inductor L1 and the second branch are arranged on the negative cable of the multi-level boost apparatus, the anode of the first diode in the (i−1)-th clamp branch is connected to the common node between the (i−1)-th second switch and the i-th the second switch, and the cathode of the first diode in the (i−1)-th clamp branch is connected to the common node between the (i-1)-th output capacitor and the i-th output capacitor. As shown in FIG. 5b, an anode of D11 is connected to the common node between D1 and D02, and a cathode of D11 is connected to the common node between Co1 and Co2.

Configurations of the clamp branches in other topologies can be obtained by analogy, and are not further described herein.

Other structures and principles are same as the above embodiments, and are not further described herein.

In practice, with a combination of the voltage dividing module, the clamp branch with a power supply and the discharge branch with power supply, it can be ensured that a voltage-division problem of each first switch at the start-up, an impulse-current problem that is apt to occur in discharging of the second capacitor, an energy-recovery problem of freewheeling of the inductor in the voltage dividing module, an energy-releasing problem of the second capacitor at shutdown of the system, and a withstand-voltage problem of the corresponding second switch are all solved.

Figure 6A:
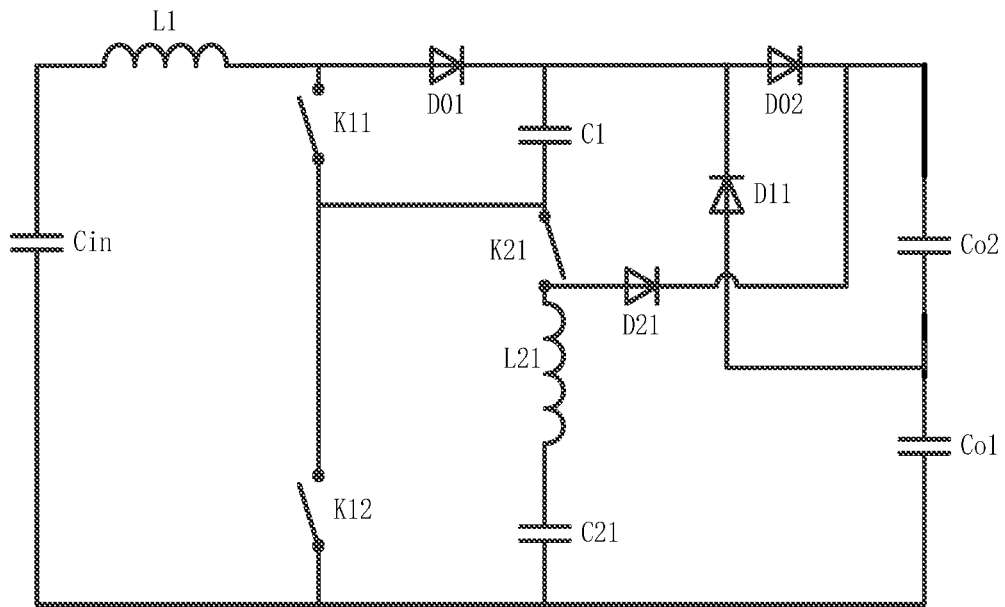
FIGS. 6a to 6c and 6e are three specific schematic structural diagrams of main circuits of three-level boost apparatuses according to another embodiment of the present disclosure.
Figure 6B:
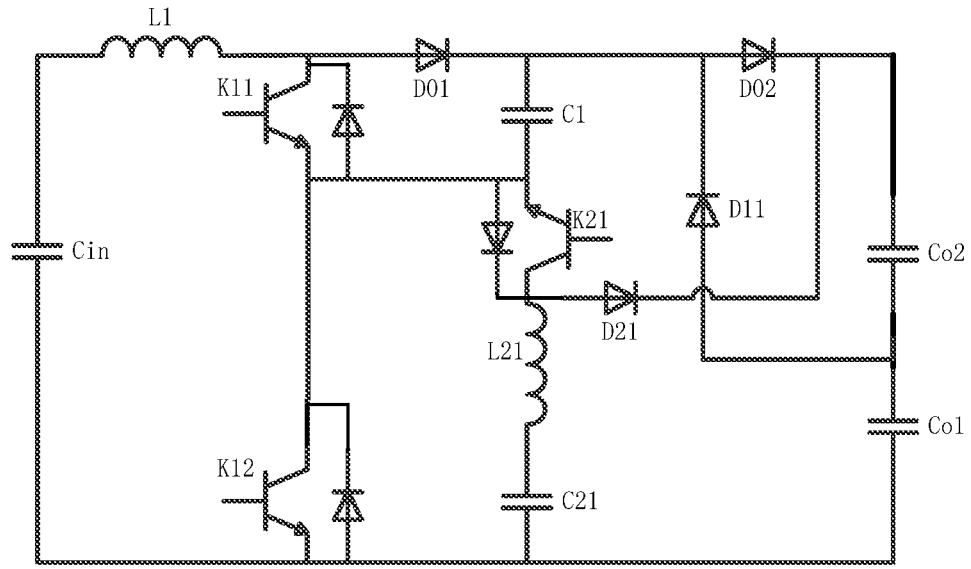
Figure 6C:
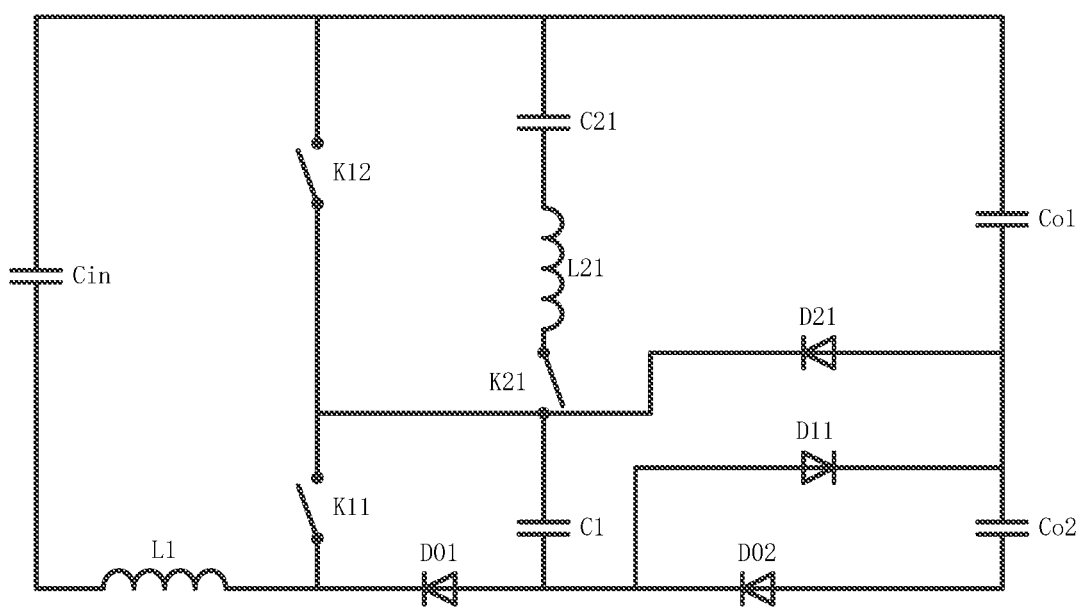
Figure 6D:
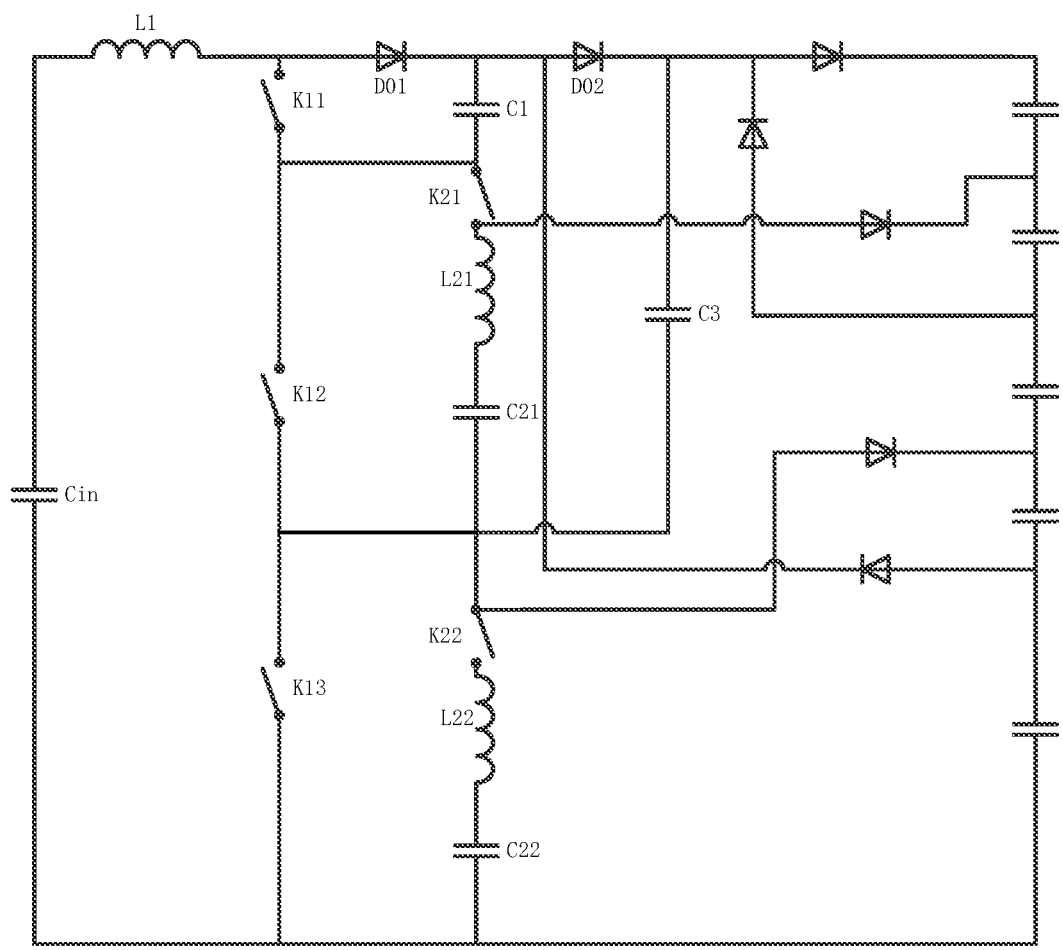
FIG. 6d is a schematic structural diagram of a main circuit of a five-level boost apparatus according to an embodiment of the present disclosure.

The solution shown in FIG. 6a can be obtained by combining FIG. 3b and FIG. 5a. FIG. 6b shows a solution in which each switch transistor is replaced with a reverse-conducting switching device IGBT on the basis of FIG. 6a. FIG. 6c is a dual topology of FIG. 6a. FIG. 6d is a five-level output topology. Topologies for more levels can be obtained by analogy, and are not shown by enumeration herein.

Figure 6E:
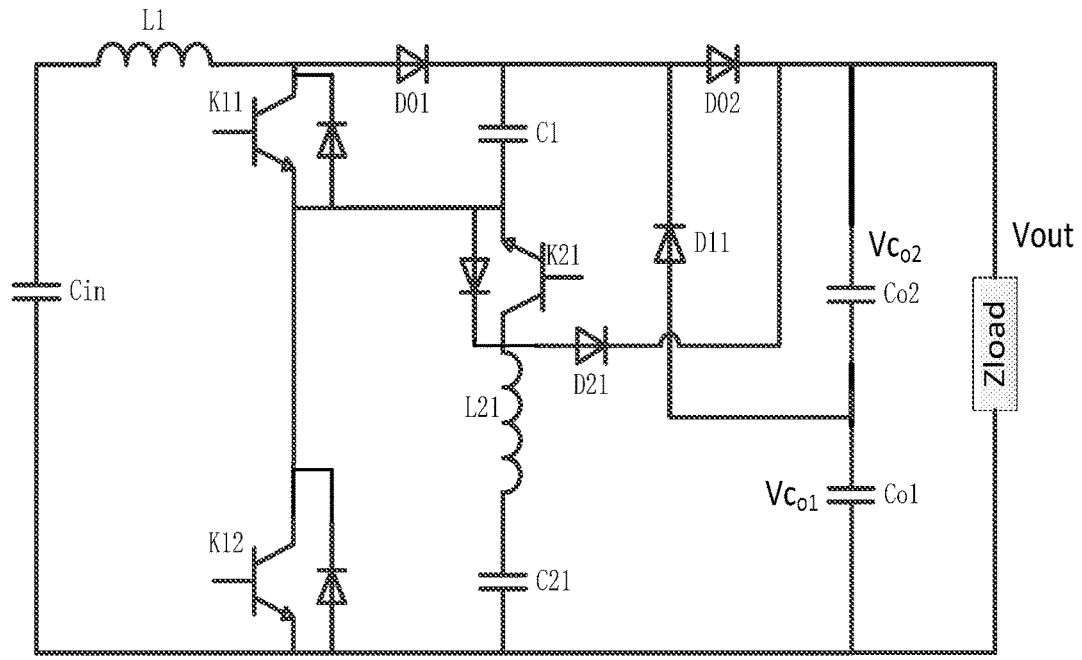

Hereinafter FIG. 6b is taken as an example to illustrate an operating process and a control strategy of the controller under the several typical operating conditions as follows. An output load Zload is added on the basis of FIG. 6b, as shown in FIG. 6e. To facilitate explanation, it is set that C1=C21, 3×Co2=Co1 and L21<<L1. A specific implementation is not limited thereto, and adjustment may be made according to a practical requirement, which all fall within the protection scope of the present disclosure.

Figure 7A:
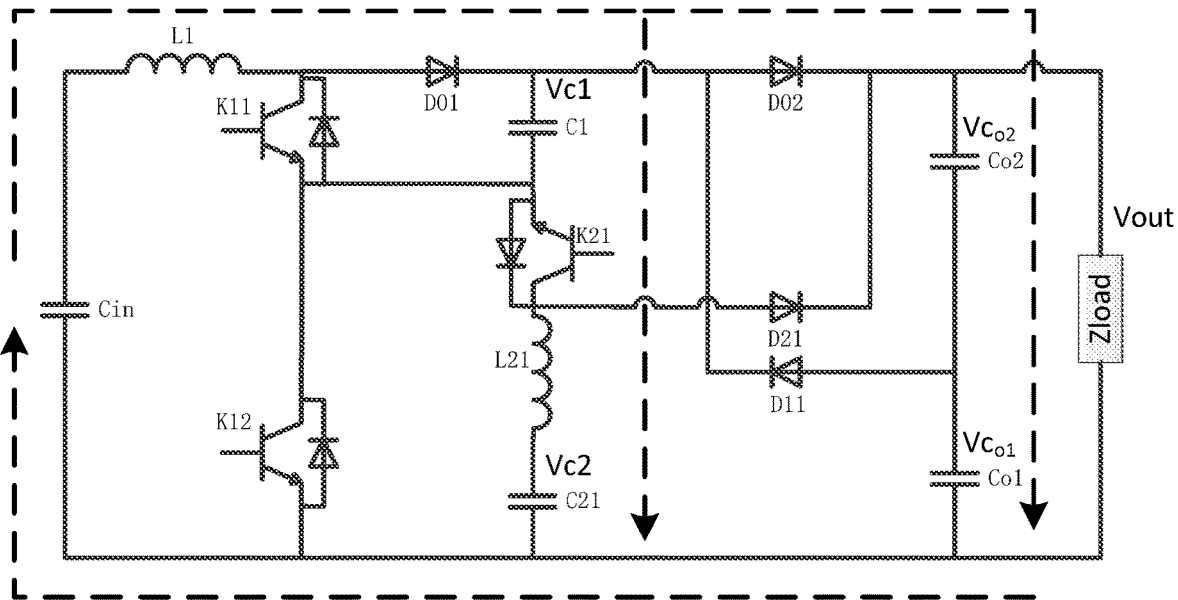
FIG. 7a is a schematic diagram of current flowing directions in a main circuit of a three-level boost apparatus according to another embodiment of the present disclosure.
Figure 7B:
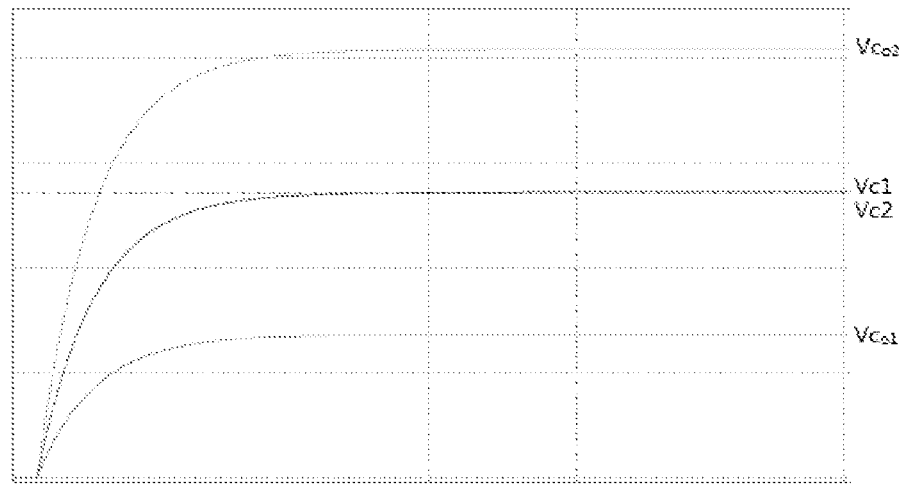
FIG. 7b is a schematic diagram of simulation of capacitor voltages in a main circuit of a three-level boost apparatus according to another embodiment of the present disclosure.

Specifically, a first operating condition is that Vin is switched in in case of Vout=Vc1=Vc2=0. Firstly, the two first switches K11 and K12 in the first branch are controlled to be turned off. L21 plus C21, Co1 and Co2 are respectively charged by Vin via a current limiting resistor (not shown) and L. Since the L21 is designed to be much smaller than L1, a voltage drop on L21 can be neglected. Moreover, an oscillation voltage formed between L1 and C1, L21 plus C21, Co1 and Co2 is small due to existence of starting resistance and the load Zload. A current loop is shown in FIG. 7a. Voltages after reaching a steady state are Vc1=Vc2=Vin/2, Vout=Vin, 4×Vco2=3×Vin and 4×Vco1=Vin. A simulation result is shown in FIG. 7b. Then, the main circuit may be controlled to enter a normal operating mode.

K11 and K12 are turned on in an interleaved manner, in a case that the main circuit enters the normal operating mode. The normal operating mode refers to an operating mode other than the controlling mode specified above. The boost device operates normally in a closed-loop manner in the normal operating mode.

Figure 8:
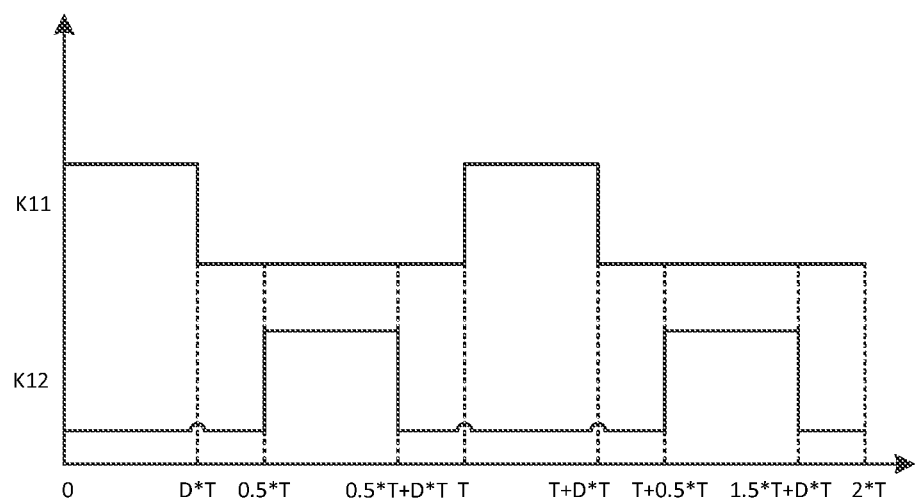
FIG. 8 is a waveform graph of pulses received by two first switches in a main circuit of a three-level boost apparatus according to another embodiment of the present disclosure.
Figure 9A:
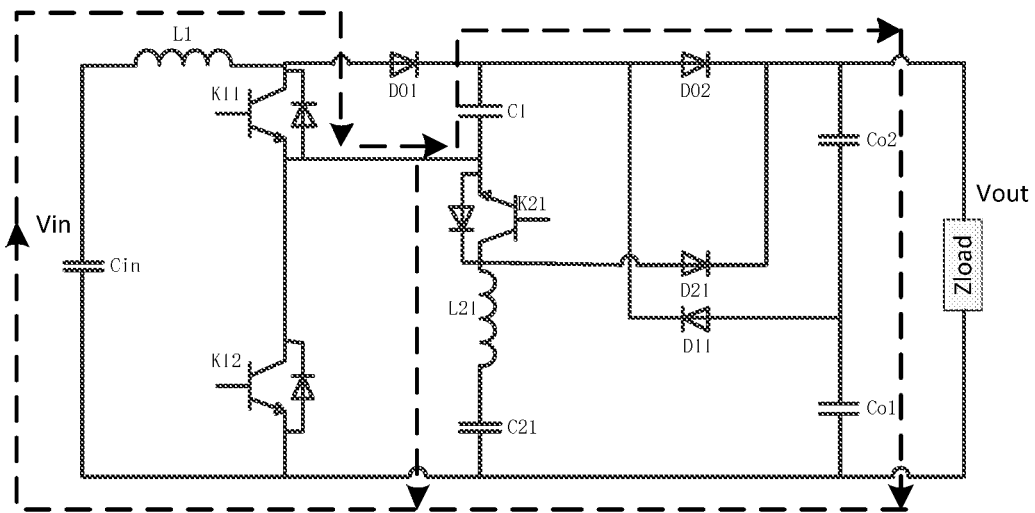
FIGS. 9a to 12 are various schematic diagrams of current flowing directions in a main circuit of a three-level boost apparatus according to another embodiment of the present disclosure.
Figure 9B:
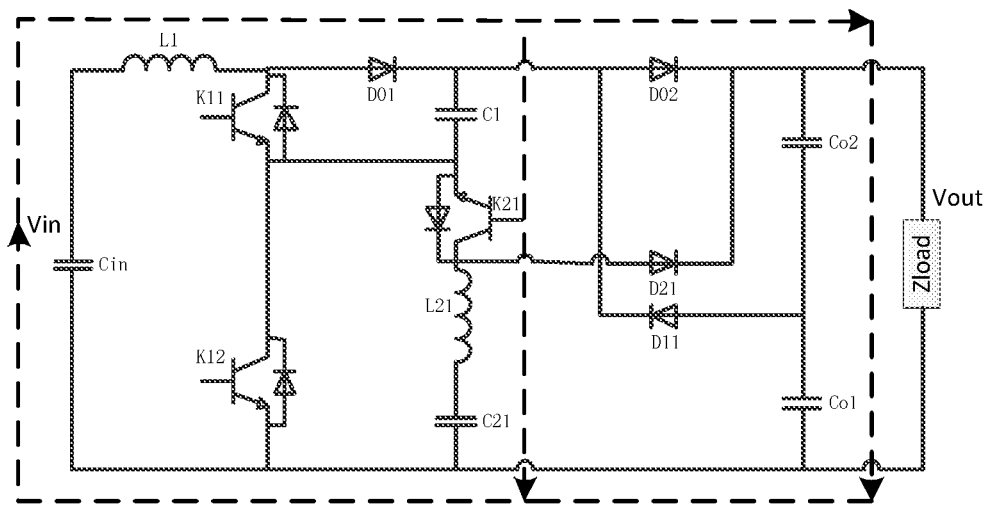
Figure 9C:
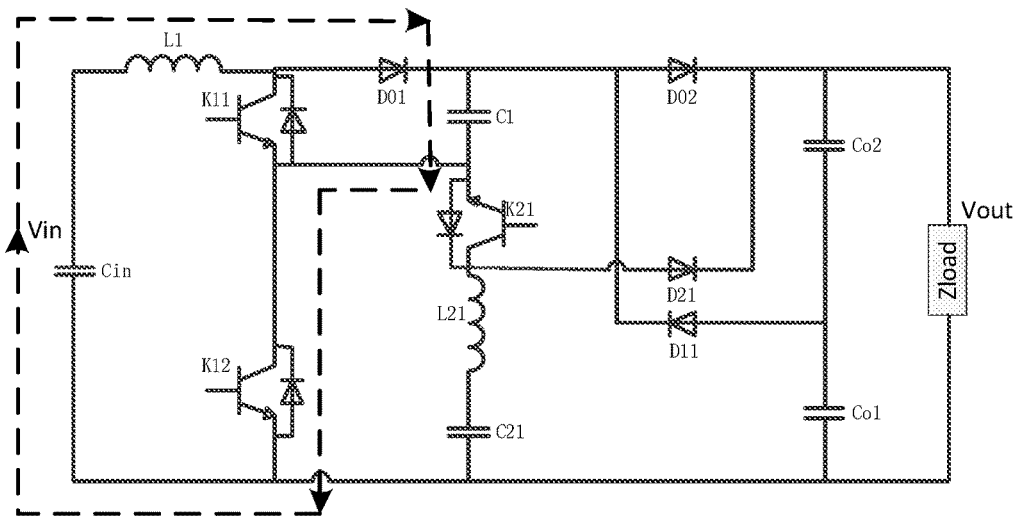

A second operating condition is that Vin is switched in, in case of Vout/2≤Vin≤Vout and Vc1=Vc2=0. Initially, a process for charging C1 and C21 is same as the first operating condition. Namely, firstly two first switches K11 and K12 in the first branch are both controlled to be turned off. Due to Vin≤Vout, the output voltage is not charged. A voltage relationship of relevant nodes is Vout≤2×Vin, Vco1=Vout/4, Vc1=Vc2=Vin/2, Vco1≤Vc1 and Vco1≤Vc2. Then after there is Vc1=Vc2=Vin/2, the two first switches K11 and K12 in the first branch are controlled to be pulsingly turned on in an interleaved manner (a waveform of the pulses is shown in FIG. 8, where T is a period of the pulses, and D is a duty cycle of the pulses) until there is Vc1+Vc2=Vout, and the main circuit is controlled to enter the normal operating mode. FIG. 9a shows that K11 is turned on and K12 is turned off. L1 is charged by Vin, C1 is discharged by Vin and C21 is charged by Vin simultaneously. FIG. 9b shows that K11 and K12 are both turned off. C1 and C21 are charged by L1. FIG. 9c shows that K12 is turned on and K11 is turned off. L1 is charged by Vin and C1 is charged by Vin simultaneously.

Figure 10A:
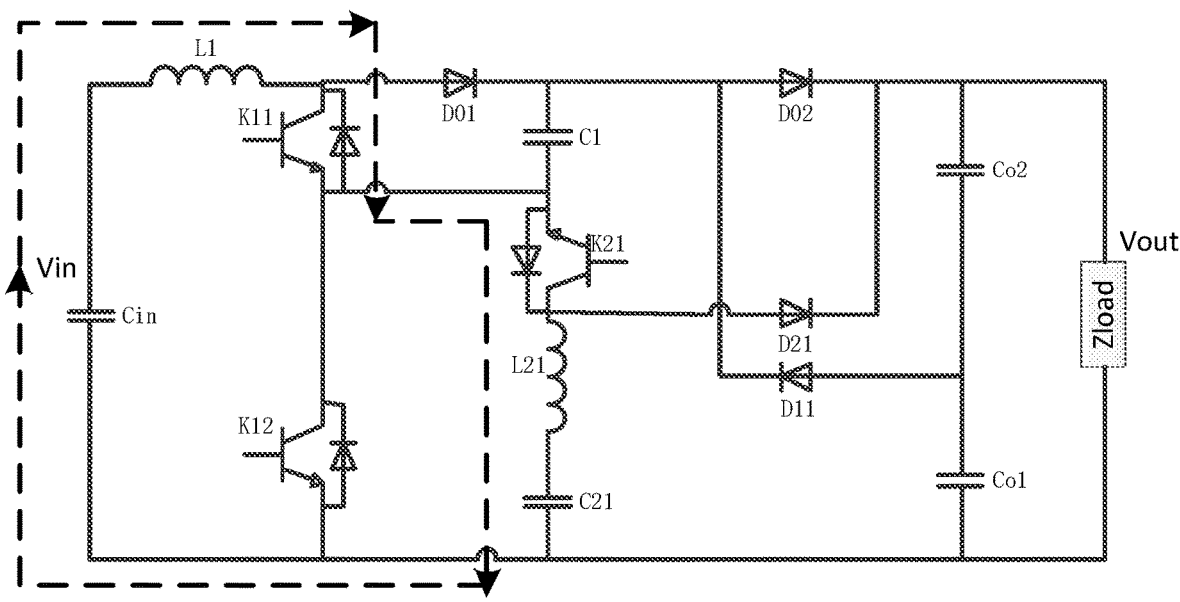
Figure 10B:
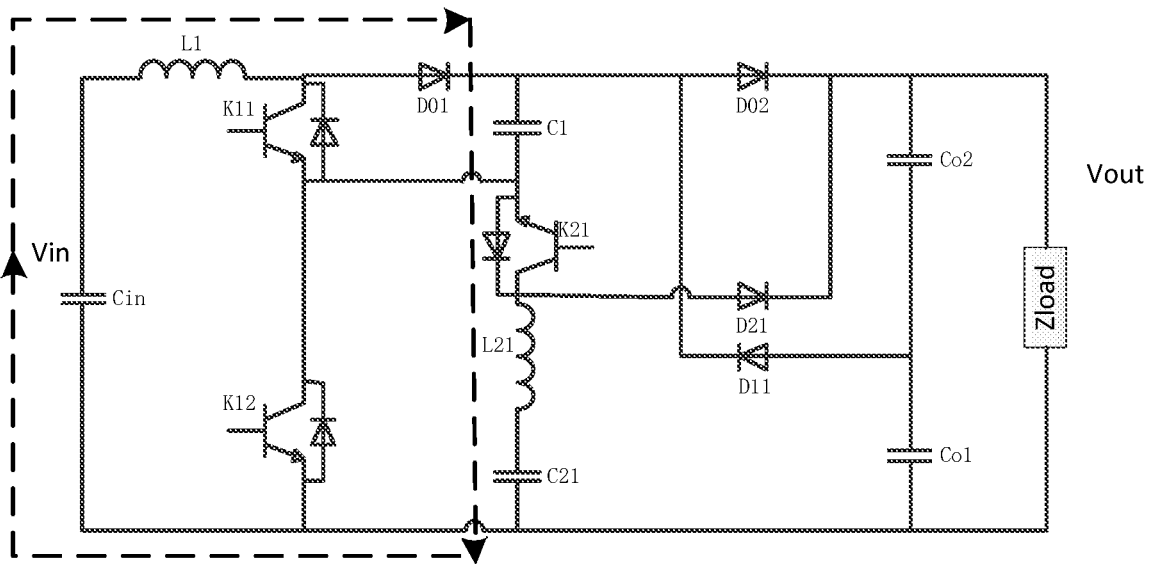

A third operating condition 3 is that Vin is switched in, in case of Vout/4≤Vin≤Vout/2 and Vc1=Vc2=0. Initially, a process for charging C1 and C21 is same as that at the beginning of the second operating condition 2. Namely, firstly the two first switches K11 and K12 in the first branch are both controlled to be turned off. Since Vin is low and the voltage across C1 is not higher than the voltage across Co1, there would be a problem that Co1 directly charges C1 in a case that pulsed charging is performed as the second operating condition 2. Devices D11 and K12 in the loop is apt to be damaged, since impedance of the loop is extremely low in such case. Therefore, C1 should be pre-charged under a special logic, and the start-up process of the second operating condition is not entered until the voltage across C1 is higher than the voltage across Co1. Namely, after Vc1=Vc2=Vin/2, the 2nd first switch K12 in the first branch is controlled to be turned off, and the 1st first switch K11 is controlled to be turned on pulsingly. In a case that K11 is on, L1, L21 and C21 are charged by Vin, and directions of current is shown in FIG. 10a. In a case that K11 is off, C1 and C21 are charged by L1, the directions of current is shown in FIG. 10b. Charging is repeated between the two modes in FIG. 10a and FIG. 10b, thereby achieving a boost charge of C1 until Vc1>Vco1. Then, the two first switches K11 and K12 in the first branch are controlled to be pulsingly turned on in an interleaved manner until Vc1+Vc2=Vout. Afterwards, the main circuit is controlled to enter the normal operating mode.

The fourth operating condition 4 is that the second capacitor C21 is discharged in a case that the main circuit is in the normal operating mode and there is Vc1=Vout/2<Vc2. The 2nd first switch K12 in the first branch is controlled to be turned off, the 1st first switch K11 is controlled to be turned on pulsingly with a period T1, and the controllable switch K21 is controlled to be turned on pulsingly with a period T2. The period T2 is smaller than the period T1. In such process, there may be four situations as shown in Table 1, and diagrams of flowing directions of current in the situations are shown in FIGS. 11a, 11b, 11c and 11d. L21 can effectively suppress a discharge current, and power in L21 is fed back to the output terminal via D21, thereby achieving discharging without losses.

TABLE 1

Figure 11A:
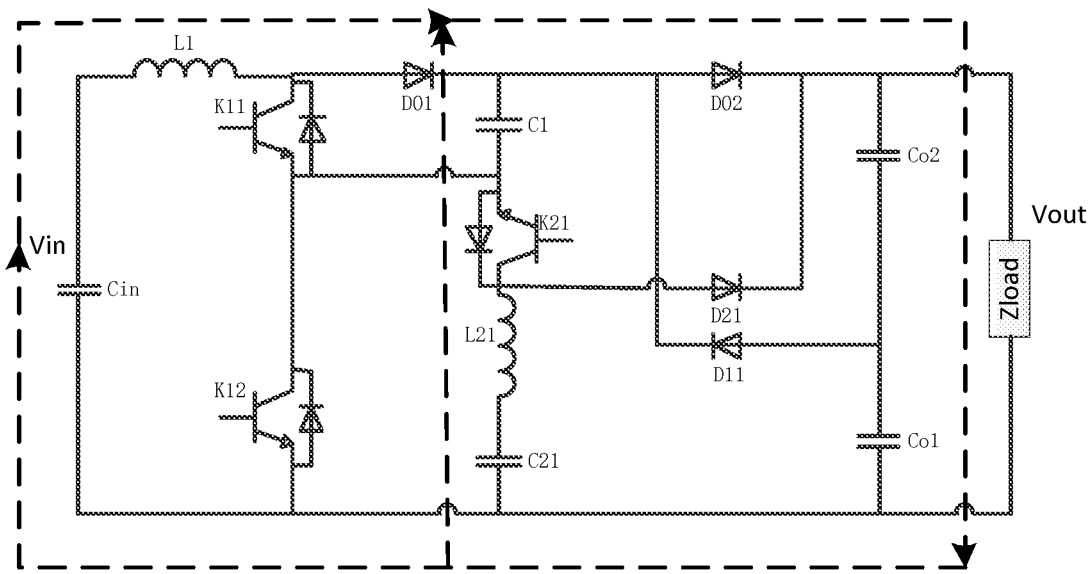
Figure 11B:
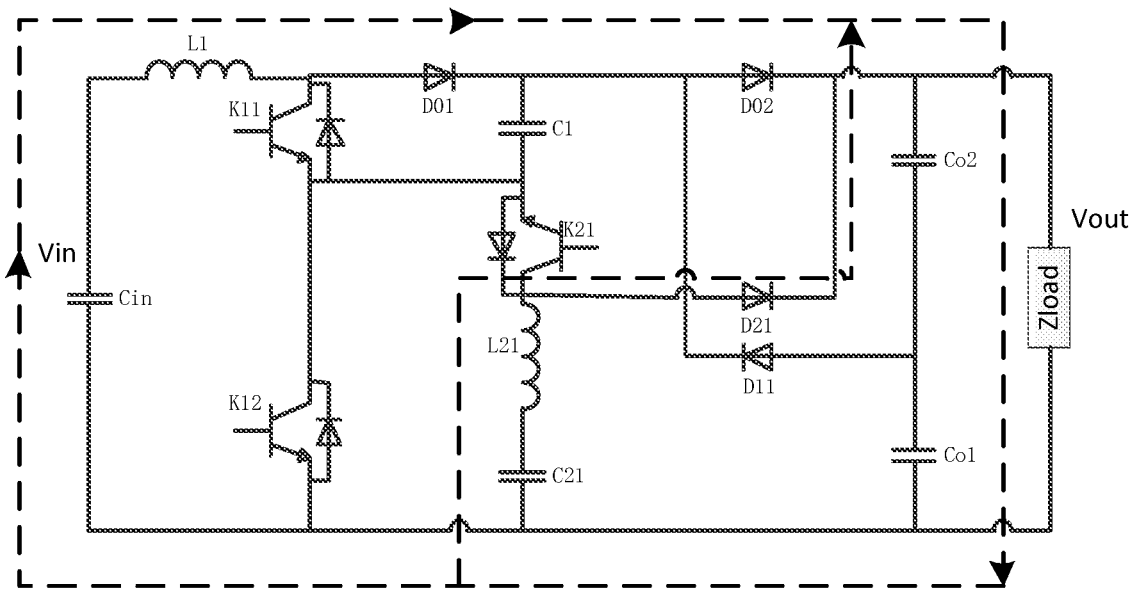
Figure 11C:
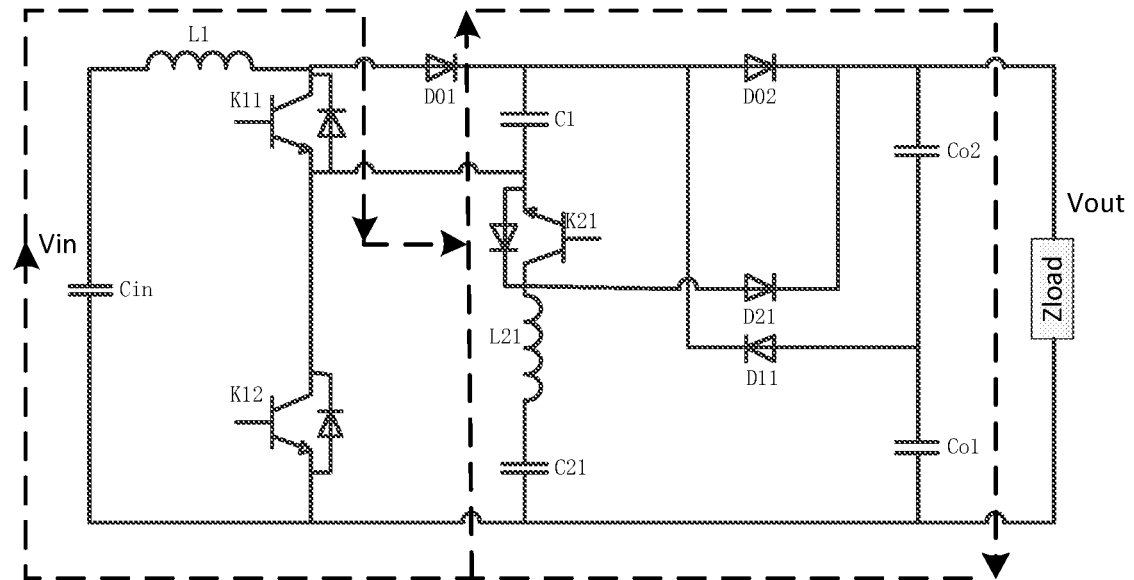
Figure 11D:
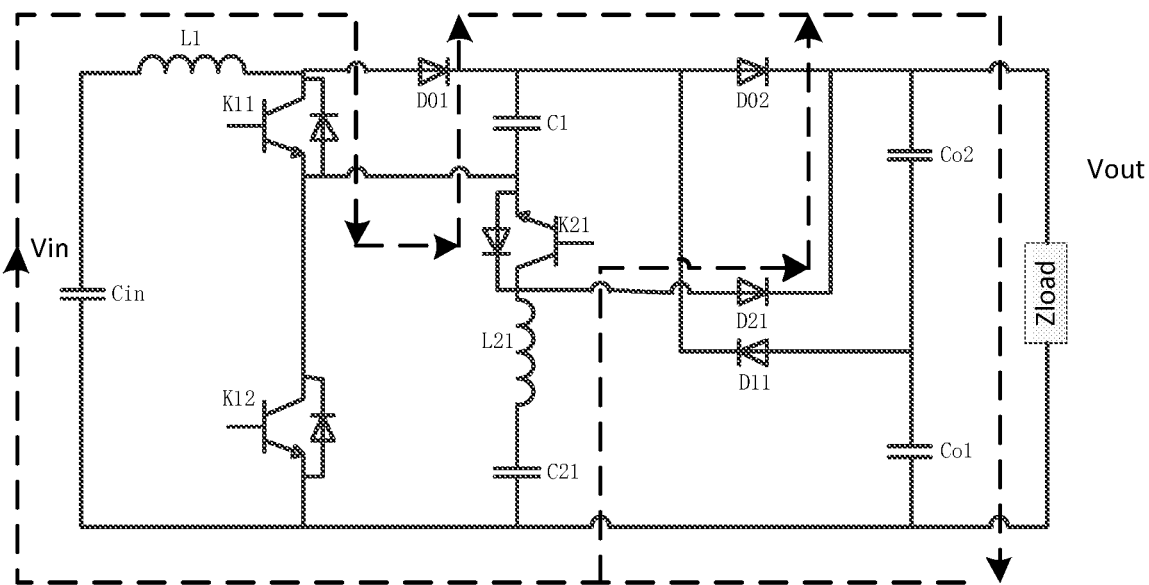

| K11 | K12 | K21 | Current flow diagram |
| --- | --- | --- | --- |
| OFF | OFF | ON | FIG. 11a |
| OFF | OFF | OFF | FIG. 11b |
| ON | OFF | ON | FIG. 11c |
| ON | OFF | OFF | FIG. 11d |

Figure 12:
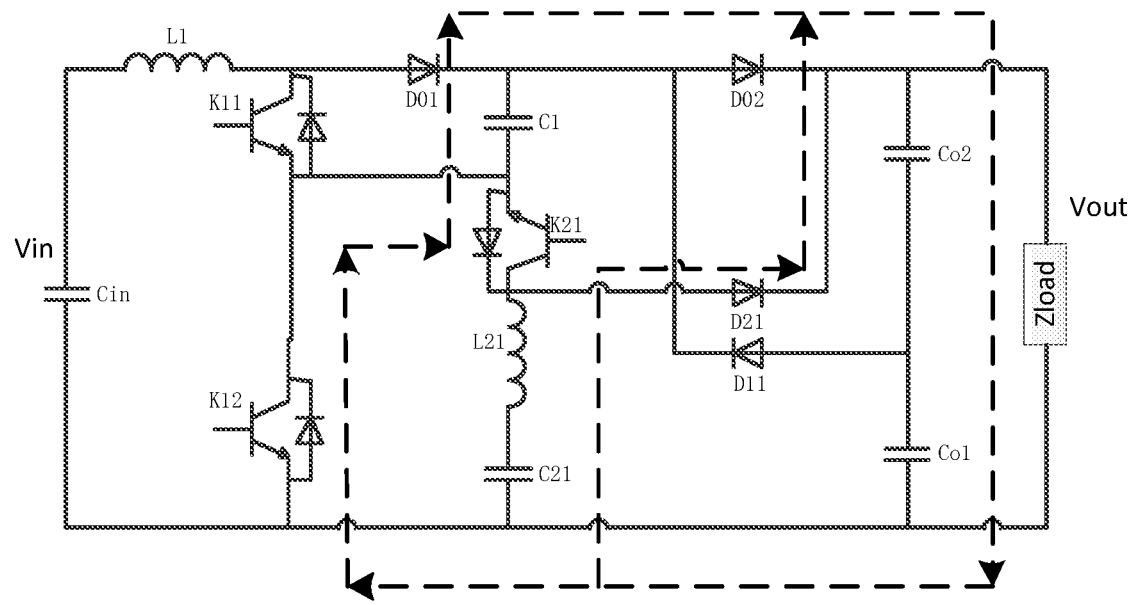

A fifth operating condition 5 is that Vin is removed at a certain moment in case of the normal operating condition of the main circuit. Internal energy storage devices of the system are discharged via some special discharge circuits at a bus side, to protect safety of maintenance personnel. In a case that both voltages Vin and Vout in the main circuit are not lower than a sum of the voltages across C1 and C21, C1 and C21 do not have relevant discharge loop. In a case that Vout is lower than the sum of the voltages across C1 and C21, C1 is discharged by connecting to the output terminal via K12 and D02, and C21 is discharged by connecting to the output terminal through D21. Reference is made to FIG. 12 for flowing directions of current.

Vout is the voltage between the two terminals of the fourth branch, namely, the output voltage of the main circuit. Vc1 is the voltage between the two terminals of the first capacitor. Vc2 is the voltage between the two terminals of the second capacitor. Vin is the input voltage of the multi-level boost apparatus. Vco1 is the voltage between the two terminals of the output capacitor that is connected to the input capacitor Cin.

It is noted that C1=C21 and 3×Co2=Co1 is set as a specific example in this embodiment. It should be appreciated that relationships between C1 and C21 and between Co1 and Co2 are not limited thereto. For example, Co2 may be N times Co1, where N>2, in other embodiments of the present disclosure.

Other principles are same as the above embodiment, and are not further described herein.

The embodiments of the present disclosure are described in a progressive manner, and each embodiment places emphasis on the difference from other embodiments. Therefore, one embodiment can refer to other embodiments for the same or similar parts.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence of the present disclosure without departing the content of the technical solutions of the present disclosure fall within the protection scope of the technical solutions of the present disclosure.

The invention claimed is:

1. A multi-level boost apparatus, wherein a main circuit of the multi-level boost apparatus comprises an input capacitor, an input inductor, a first branch, a second branch, a third branch, and a fourth branch; and wherein:
    a terminal of the input inductor is connected to a terminal of the input capacitor, and another terminal of the input inductor is connected to a terminal of the first branch and a terminal of the second branch;
    the first branch comprises N first switches sequentially connected in series, a first one of the N first switches is connected to the input inductor, and N is a positive integer greater than 1;
    the second branch comprises N second switches sequentially connected in series, a first one of the N second switches is connected to the input inductor, and a common node between the first one of the N second switches and a second one of the N second switches is connected to a terminal of the third branch;
    the third branch comprises N voltage dividing modules sequentially connected in series, and a first one of the N voltage dividing modules comprises a first capacitor;
    for each positive integer i that is greater than 1 and smaller than or equal to N:
        a common node between an (i−1)-th one of the N voltage dividing modules and an i-th one of the N voltage dividing modules is connected to a common node between an (i−1)-th one of the N first switches and an i-th one of the N first switches;
        the i-th one of the N voltage dividing modules comprises:
            a controllable switch, a second inductor, and a second capacitor that are connected in series; and
            a discharge branch, configured to provide an electrical discharging loop for the second inductor, wherein the discharge branch comprises a second power source, the second power source is configured to receive power from the second inductor, and the second capacitor is charged in a default state of the controllable switch;
    another terminal of the second branch is connected to a terminal of the fourth branch, the terminal of the fourth branch and another terminal of the fourth branch are output terminals of the main circuit, and the fourth branch comprises at least one output capacitor; and
    another terminal of the first branch, another terminal of the third branch, and the another terminal of the fourth branch are connected to another terminal of the input capacitor.

2. The multi-level boost apparatus according to claim 1, wherein:
    the discharge branch further comprises a directional device connected in series with the second power source; and
    the directional device is configured to prevent power from flowing from the second power source to the second inductor.

3. The multi-level boost apparatus according to claim 2, wherein the directional device is a second diode.

4. The multi-level boost apparatus according to claim 1, wherein:

N is greater than 2, and the multi-level boost apparatus further comprises N−1 connection capacitors; and for each positive integer j that is smaller than N−1:
- a terminal of a j-th one of the N−1 connection capacitors is connected to a common node between a (j+1)-th one of the N second switches and a (j+2)-th one of the N second switches; and
- another terminal of the j-th one of the N−1 connection capacitors is connected to a common node between a (j+1)-th one of the N voltage dividing modules and a (j+2)-th one of the N voltage dividing modules.

5. The multi-level boost apparatus according to claim 1, wherein the N first switches are reverse-conducting transistors, the N second switches are diodes, and the controllable switch is a mechanical switch or a reverse-conducting transistor; and wherein:
- the input inductor and the second branch are arranged on a positive cable of the multi-level boost apparatus, and a common node between an (i−1)-th one of the N second switches and an i-th one of the N second switches is a node connecting a cathode of an (i−1)-th one of the diodes and an anode of an i-th one of the diodes, for each positive integer i that is greater than 1 and smaller than or equal to N; or
- the input inductor and the second branch are arranged on a negative cable of the multi-level boost apparatus, and a common node between an (i−1)-th one of the N second switches and an i-th one of the N second switches is a node connecting between an anode of an (i−1)-th one of the diodes and a cathode of an i-th one of the diodes, for each positive integer i that is greater than 1 and smaller than or equal to N.

6. The multi-level boost apparatus according to claim 1, wherein:
- the fourth branch comprises a plurality of output capacitors sequentially connected in series; and
- the second power source comprises all or a part of the plurality of output capacitors in the fourth branch.

7. The multi-level boost apparatus according to claim 1, wherein the main circuit further comprises N−1 clamp branches;
- wherein for each positive integer i that is greater than 1 and smaller than or equal to N, a common node between an (i−1)-th one of the N second switches and an i-th one of the N second switches is connected to a terminal of an (i−1)-th one of the N−1 clamp branches, and the (i−1)-th one of the N−1 clamp branches is configured to reduce a voltage across the i-th one of the N second switches; and
- wherein the other terminals of the N−1 clamp branches are all connected to a connection point of the input capacitor, the first branch, the third branch and the fourth branch.

8. The multi-level boost apparatus according to claim 7, wherein the clamp branch comprises a first diode and a first power source, and the first power source is configured to reduce a voltage across the i-th one of the second switches.

9. The multi-level boost apparatus according to claim 7, wherein the fourth branch comprises N output capacitors sequentially connected in series, a first one of the N output capacitors is connected to the input capacitor, and an N-th one of the output capacitors is connected to the second branch, and each of the N−1 clamp branches comprises a first diode; and wherein:
- the input inductor and the second branch are arranged on a positive cable of the multi-level boost apparatus, and a cathode of the first diode in the (i−1)-th one of the N−1 clamp branches is connected to the common node between the (i−1)-th one of the N second switches and the i-th one of the N second switches, and an anode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N; or
- the input inductor and the second branch are arranged on a negative cable of the multi-level boost apparatus, and an anode of the first diode in the (i−1)-th one of the N−1 clamp branches is connected to the common node between the (i−1)-th one of the N second switches and the i-th one of the N second switches, and a cathode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N.

10. The multi-level boost apparatus according to claim 9, wherein N is equal to 2, and the fourth branch comprises two output capacitors connected in series;

wherein a controller of the multi-level boost apparatus is configured to:
- control the two first switches in the first branch to be turned off in response to Vin being switched in and Vout=Vc1=Vc2=0, and then control the main circuit to enter a normal operating mode in response to Vout=Vin;
- control the two first switches in the first branch to be turned off in response to Vin being switched in, Vout/2≤Vin≤Vout and Vc1=Vc2=0; then control the two first switches in the first branch to be pulsingly turned on in an interleaved manner in response to Vc1=Vc2=Vin/2, until Vc1+Vc2=Vout; and then control the main circuit to enter the normal operation mode in response to Vc1+Vc2=Vout;
- control the two first switches in the first branch to be turned off in response to Vin being switched in, Vout/4≤Vin≤Vout/2 and Vc1=Vc 2=0; then control a second one of the two first switches in the first branch to be turned off, and the first one of the two first switches be turned on pulsingly, in response to Vc1=Vc2=Vin/2; then control the two first switches in the first branch to be pulsingly turned on in an interleaved manner in response to Vc1>Vco1, until Vc1+Vc2=Vout; and then control the main circuit to enter the normal operation mode in response to Vc1+Vc2=Vout; and
- control the second one of the two first switches in the first branch to be turned off, control the first one of the two first switches to be turned on pulsingly with a period of T1, and control the controllable switch to be turned on pulsingly with a period of T2, to discharge the second capacitor, in response to Vc1=Vout/2<Vc2 and the main circuit being in the normal operation mode, wherein T2 is smaller than T1; and wherein Vout is a voltage across the fourth branch, Vc1 is a voltage across the first capacitor, Vc2 is a voltage across the second capacitor, Vin is an input voltage of the multi-level boost apparatus, Vco1 is a voltage across one of the two output capacitors that is connected to the input capacitor, the first capacitor and the second capacitor are equal in capacitance, and capacitance of the one of the two output capacitors is three times the capacitance of another of the two output capacitors.

11. The multi-level boost apparatus according to claim 2, wherein:
   the fourth branch comprises a plurality of output capacitors sequentially connected in series; and
   the second power source comprises all or a part of the plurality of output capacitors in the fourth branch.

12. The multi-level boost apparatus according to claim 3, wherein:
   the fourth branch comprises a plurality of output capacitors sequentially connected in series; and
   the second power source comprises all or a part of the plurality of output capacitors in the fourth branch.

13. The multi-level boost apparatus according to claim 4, wherein:
   the fourth branch comprises a plurality of output capacitors sequentially connected in series; and
   the second power source comprises all or a part of the plurality of output capacitors in the fourth branch.

14. The multi-level boost apparatus according to claim 5, wherein:
   the fourth branch comprises a plurality of output capacitors sequentially connected in series; and
   the second power source comprises all or a part of the plurality of output capacitors in the fourth branch.

* * * * *